(12) United States Patent
Shieh et al.

(10) Patent No.: US 12,278,838 B2
(45) Date of Patent: Apr. 15, 2025

(54) SYSTEM AND METHOD FOR MANAGING A FEDERATED BROWSER SECURITY IN AN ENTERPRISE ENVIRONMENT

(71) Applicant: Appaegis Inc., Palo Alto, CA (US)

(72) Inventors: Choung-Yaw Michael Shieh, Palo Alto, CA (US); Yonghui Cheng, Los Altos, CA (US)

(73) Assignee: Appaegis Inc., Palo Alto, CA (US)

( * ) Notice: Subject to any disclaimer, the term of this patent is extended or adjusted under 35 U.S.C. 154(b) by 260 days.

(21) Appl. No.: 18/194,692

(22) Filed: Apr. 3, 2023

(65) Prior Publication Data
US 2024/0155001 A1   May 9, 2024

Related U.S. Application Data

(60) Provisional application No. 63/423,807, filed on Nov. 9, 2022.

(51) Int. Cl.
*H04L 29/06* (2006.01)
*H04L 9/40* (2022.01)

(52) U.S. Cl.
CPC ...... *H04L 63/1483* (2013.01); *H04L 63/1425* (2013.01)

(58) Field of Classification Search
CPC .................. H04L 63/1483; H04L 63/1425
See application file for complete search history.

(56) References Cited

U.S. PATENT DOCUMENTS

| | | | |
|---|---|---|---|
| 2016/0036975 A1* | 2/2016 | O'Connor | H04M 3/5191 379/265.09 |
| 2021/0243208 A1* | 8/2021 | Rubin | G06F 21/552 |
| 2021/0328807 A1* | 10/2021 | Bansal | H04L 9/3273 |
| 2021/0352069 A1* | 11/2021 | Momchilov | G06F 21/32 |
| 2022/0368699 A1* | 11/2022 | Thomson | H04L 63/1483 |

OTHER PUBLICATIONS

Monschein et al., "Towards a Peer-to-Peer Federated Machine Learning Environment for Continuous Authentication", 2021 IEEE Symposium on Computers and Communications (ISCC), Date of Conference: Sep. 5-8 (Year: 2021).*

* cited by examiner

*Primary Examiner* — Morshed Mehedi
(74) *Attorney, Agent, or Firm* — Jason C. Cameron

(57) ABSTRACT

A system and method for federated browser security in an enterprise environment is disclosed. The system monitors user browsing activities and enterprise contexts on local web browser hosted on user device, and device attributes corresponding to user device. Further, the system detects pre-defined enterprise identifier. Furthermore, the system initiates execution of secure web browser hosted on user device or virtual private cloud associated with enterprise environment. Additionally, the system routes login/web page URL, user login credentials, and information corresponding to login web page URL, from local web browser to secure web browser. Further, the system manages, in response to routing login web page URL, user login credentials, and information associated with login webpage, list of enterprise URL, federated identity of user in secure web browser, for managing federated browser security in enterprise environment. The federated browser security is managed for visibility and control of enterprise security in enterprise environment.

20 Claims, 5 Drawing Sheets

SYSTEM AND METHOD FOR MANAGING A FEDERATED BROWSER SECURITY IN AN ENTERPRISE ENVIRONMENT

EARLIEST PRIORITY DATE

This application claims priority from a Provisional patent application filed in the US having Patent Application No. 63/423,807, filed on Nov. 9, 2022, and titled "Federated browser protection for enterprise remote access security".

TECHNICAL FIELD

Embodiments of the present disclosure relate to cybersecurity systems and more particularly relate to a system and a method for managing a federated browser security in an enterprise environment based on developing federation security models among browsers to improve security in safeguarding enterprise applications.

BACKGROUND

Generally, browsers are the primary gateway for remote access, and users access enterprise applications via browsers in data centers, a cloud, software-as-a-service (SaaS) applications, and the internet. Therefore, it is crucial to have a secure browsing to protect users from identity theft, phishing attacks, malware infiltration, and data leakage. One way to enhance browser security is by creating a secure browser that closely monitors user activities such as file uploads and downloads to enforce access policies that allow access from managed devices. However, users are accustomed to their current browsers and may be hesitant to switch to a new browser. This can slow down the adoption of more secure browsing to protect users. Further, users would be required to either learn how to use a new secure browser or continue to use their existing browser without the added security provided by a secure browser.

Conventionally, the methods provide automated or semi-automated management of devices used for accessing managed resources of an enterprise. The conventional method enables enterprise users to securely access enterprise resources (documents, data, application servers, and the like.) using their laptops or mobile devices. Hence, the conventional method provides a secure storage in the local machine for the enterprise applications. Another conventional method provides secure execution of enterprise applications on laptops or mobile devices. The conventional method discloses a client-side code installed on the laptops or mobile devices to further enhance security by, creating a secure container for locally storing enterprise data, creating a secure execution environment for running enterprise applications, and/or creating secure application tunnels for communicating with the enterprise system. Hence, the conventional method provides a virtual machine to create different application launch scheme.

However, the conventional method may not allow users to continue to use their existing browsers while benefiting from enhanced security features. Further, the conventional methods may not provide security in remote access and protect users from cyber threats, which is crucial in today's world where remote work has become the norm. The conventional methods may not provide significant implications for enterprises looking to enhance their cybersecurity posture without compromising user convenience.

Hence, there is a need in the art for a system and a method for managing a federated browser security in an enterprise environment to address at least the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a computer-implemented system for managing a federated browser security in an enterprise environment. The system monitors at least one of one or more user browsing activities and one or more enterprise contexts on a local web browser hosted on a user device associated with a user and one or more device attributes corresponding to the user device. Further, the system detects a pre-defined enterprise identifier corresponding to an enterprise environment, from at least one of a universal resource locator (URL) address of a web page or one or more user login credentials input on the local web browser hosted on the user device, based on the monitored at least one of one or more user browsing activities. Furthermore, the system initiates, in response to the detected pre-defined enterprise identifier, an execution of a secure web browser hosted on at least one of the user device and a virtual private cloud associated with the enterprise environment. Additionally, the system routes, in response to initiating the execution of the secure web browser, at least one of a web page URL, a login web page URL, or the user login credentials and information associated with a login webpage corresponding to the web page URL, the login web page URL, from the local web browser to the secure web browser. Further, the system manages, in response to routing at least one of the login web page URL, or the user login credentials and the information associated with the login webpage, a list of the enterprise URL or a list of federated identity of the user in the secure web browser, for managing a federated browser security in the enterprise environment. The federated browser security is managed for visibility and control of an enterprise security in the enterprise environment.

Another aspect of the present disclosure provides a computer-implemented method for managing a federated browser security in an enterprise environment, The method includes monitoring at least one of one or more user browsing activities and one or more enterprise contexts on a local web browser hosted on a user device associated with a user and one or more device attributes corresponding to the user device. Further, the method includes detecting a pre-defined enterprise identifier corresponding to an enterprise environment, from at least one of a universal resource locator (URL) address of a web page or one or more user login credentials input on the local web browser hosted on the user device, based on the monitored at least one of one or more user browsing activities. Furthermore, the method includes initiating, in response to the detected pre-defined enterprise identifier, an execution of a secure web browser hosted on at least one of the user device or a virtual private cloud associated with the enterprise environment. Additionally, the method includes routing, in response to initiating the execution of the secure web browser, at least a web page URL, or one of a web page URL, a login web page URL, the user login credentials, and information associated with a login webpage corresponding to the login web page URL, from the local web browser to the secure web browser. Further, the method includes managing, in response to routing at least one of the web page URL, the login web page URL, the user login credentials, and the information associated with the login webpage, a list of the enterprise URL or a list of federated identity of the user in the secure web browser, for managing a federated browser security in the enterprise environment. The federated browser security is managed for visibility and control of an enterprise security in the enterprise environment.

Yet another aspect of the present disclosure provides a non-transitory computer-readable storage medium having programmable instructions stored therein. When the programmable instructions executed by one or more hardware processors, cause the one or more hardware processors to monitor at least one of one or more user browsing activities and one or more enterprise contexts on a local web browser hosted on a user device associated with a user and one or more device attributes corresponding to the user device. The processor detects a pre-defined enterprise identifier corresponding to an enterprise environment, from at least one of a universal resource locator (URL) address of a web page or one or more user login credentials input on the local web browser hosted on the user device, based on the monitored at least one of one or more user browsing activities. Further, the processor initiates, in response to the detected pre-defined enterprise identifier, an execution of a secure web browser hosted on at least one of the user device and a virtual private cloud associated with the enterprise environment. Furthermore, the processor routes, in response to initiating the execution of the secure web browser, at least one of a login web page URL, a web page URL, the user login credentials, and information associated with a login webpage corresponding to the web page URL, the login web page URL, from the local web browser to the secure web browser. Additionally, the processor manages, in response to routing at least one of the login web page URL, the user login credentials, and the information associated with the login webpage, a list of the enterprise URL, a list of federated identity of the user in the secure web browser, for managing a federated browser security in the enterprise environment. The federated browser security is managed for visibility and control of an enterprise security in the enterprise environment.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF ACCOMPANYING DRAWINGS

The disclosure will be described and explained with additional specificity and detail with the accompanying figures in which.

Figure 1:
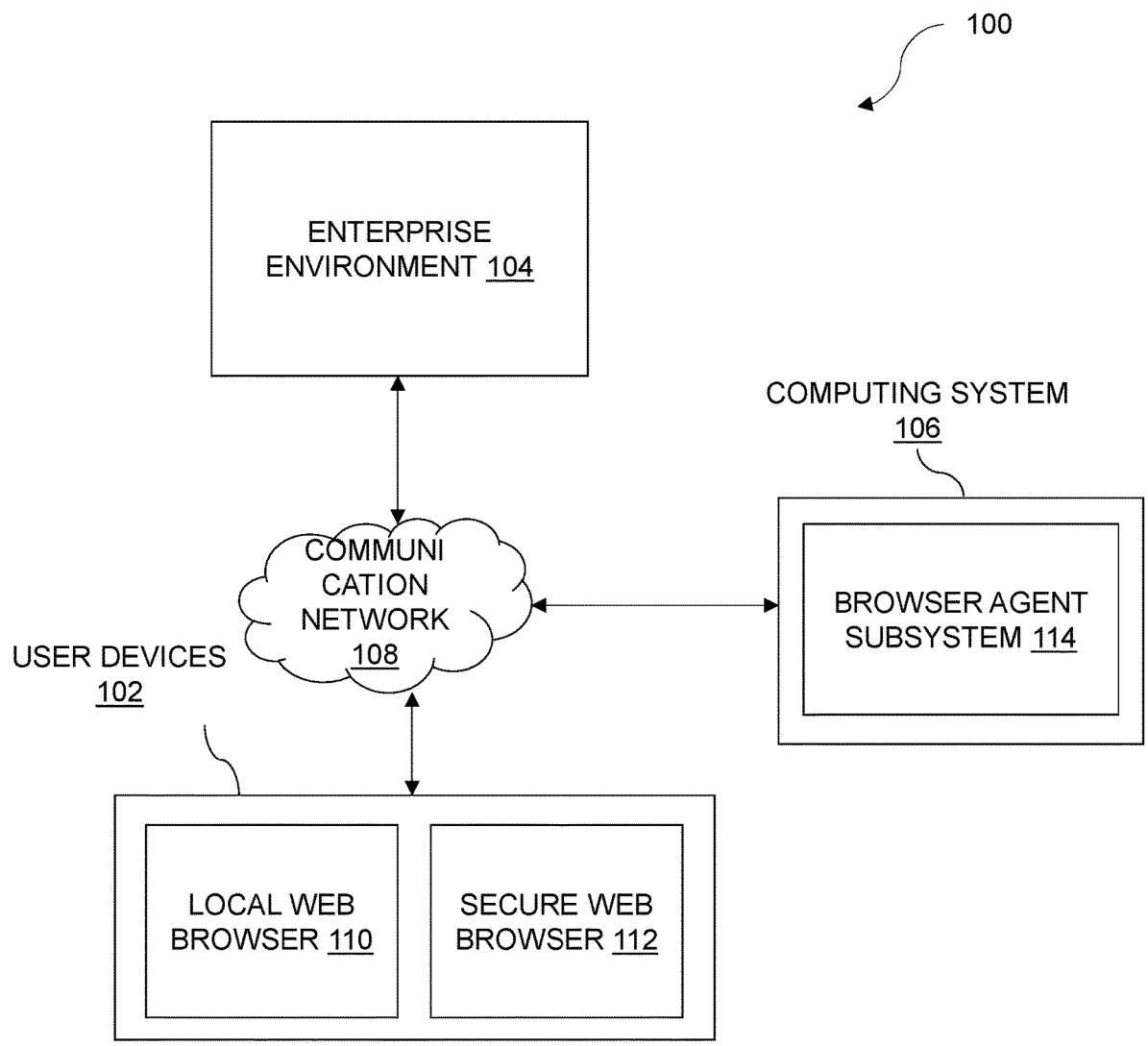
FIG. 1 illustrates an exemplary block diagram representation of a network architecture implementing a system for managing a federated browser security in an enterprise environment, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client, or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or s "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired), or temporarily configured (programmed) to operate in a certain manner and/or to perform certain operations described herein.

Throughout this document, the terms 'browser' and 'browser application' may be used interchangeably to mean the same thing. In some respects, the terms 'web application' and 'web app' may be used interchangeably to refer to an application, including metadata, that is installed in a browser application. In some respects, the terms web application and web app may be used interchangeably to refer to a website and/or application to which access is provided over a network (e.g., the Internet) under a specific profile (e.g., a website that provides email service to a user under a specific profile). In some respects, the term application, when used by itself without modifiers, may be used to refer to, but is not limited to, a web application and/or an extension application that is installed or is to be installed in the browser application.

Embodiments of the present disclosure system and a method for managing a federated browser security in an enterprise environment based on developing federation security models among browsers to improve security in safeguarding enterprise applications. The present disclosure uses browser agents for federated browser security in the enterprise environment. The browser agents for federated browser security provide an ability for users to continue using their existing browsers while automating access to a secure browser for enterprise applications, thereby extending security protection to existing browsers. The federation security model of the present disclosure enables all browsers to detect enterprise context and automatically route browsing activities to a secure web browser for better protection of enterprise applications. This helps the security team deploy secure browsers without changing users' familiar browsers and provides good separation for personal browsing and enterprise application access with close monitoring and control. The present disclosure provides an improved security posture, by using a secure browser for enterprise application access, the organization can closely monitor malware invasion/malicious activities (such as phishing and identity theft) and data leakage, improving the overall security posture. The present disclosure solves the issue of browsers being built for generic browsing activities, with the secure browser being purpose-built or running in an isolated environment to secure remote access.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary block diagram representation of a network architecture 100 implementing a system 106 for managing a federated browser security in an enterprise environment, in accordance with an embodiment of the present disclosure. According to FIG. 1, the network architecture 100 may include one or more user devices 102 associated with a user, and an enterprise environment 104 communicatively coupled to the computing system 106 via a communication network 108.

Further, the one or more user devices 102 (individually referred to as the user device 102, and collectively referred to as the user devices 102) may host a local web browser 110, and a secure web browser 112. Further, the computing system 106 may be associated with a browser agent subsystem 114. In an embodiment, the computing system 106 and the browser agent subsystem 114 may be communicatively coupled to the user device 102. In another embodiment, the computing system 106 and the browser agent subsystem 114 may be associated with the computing system 106.

Federated browser security may refer to a security approach in which multiple web browsers, operating across different devices and platforms, are connected, and coordinated through a central authority or network. The goal of federated browser security is to provide a unified and secure browsing experience for users across different devices and platforms. The security aspect of federated browsing is primarily focused on protecting user data and privacy, as well as preventing security threats such as malware, phishing, and unauthorized access. This is achieved through a variety of measures, such as using encryption to protect user data in transit, implementing strong authentication and access control mechanisms, and regularly updating browser software to address vulnerabilities and exploits. Another important aspect of federated browser security is the use of standardized protocols and interfaces for communication and data exchange between browsers. This allows different browsers to share information and coordinate their security measures more effectively, which can help to prevent and mitigate security threats across different platforms and devices.

Further, the federated identity refers to an approach in which digital identity information is shared between different organizations or systems, typically using a standardized set of protocols and technologies. The goal of federated identity is to provide users with a seamless and secure way to access multiple services and systems using a single set of login credentials, while also allowing organizations to maintain control over their own user data and authentication processes. In a federated identity system (not shown), a user's identity information is typically stored and managed by a central identity provider (IdP). When the user tries to access a service or application that is part of the federated system, the service or application redirects the user to the IdP for authentication. The IdP then verifies the user's identity and sends an assertion back to the service or application, indicating that the user has been authenticated. One of the key benefits of federated identity is that it allows users to access multiple services and systems using a single set of login credentials, which can improve convenience and reduce the need for users to remember and manage multiple usernames and passwords. Additionally, federated identity systems can be more secure than traditional username/password authentication, as they can incorporate stronger authentication methods such as multi-factor authentication.

The local web browser 110 may be a web browser installed on the user device 102 by the user, which may be a preferred browser by the user. The local web browser 110 can be configured to perform the functions of conventional web browsers, including surfing Internet sites, displaying and/or playing multimedia content, received from web servers, and the like. Further, the secure web browser 112 may be a web browser within which the one or more enterprise applications can run. The secure web browser 112 may be provided with some or all of the enterprise security and other features described herein and can extend those features for use with the user device applications that run within the secure web browser 112. In this way, the secure web browser 112 can be used to implement bring your own device/technology (BYOD/BYOT) policies while maintaining a desired level of control over applications running on the user device 102 of the user. An enterprise can require some or all of its users to install and use the secure web browser 112 or a browser agent to the local web browser 110, to reduce enterprise security risks associated with the use of software as a service (SaaS) and Internet applications. As mentioned above, the secure browsing can also be used to enable laptop or mobile device users to access a corporate intranet without the need for a virtual private network (VPN).

The user devices 102 may be, but is not limited to, a laptop computer, a desktop computer, a tablet computer, a phablet computer, a smartphone, a wearable device, a smartwatch, a personal digital assistant (PDA), a Virtual/Augmented Reality (AR/VR) device, an image capturing device, and the like. Further, the communication network 106 may be a wired communication network and/or a wireless communication network. In one specific embodiment, the communication network 106 may include, but is not limited to, an internet connection, a wireless fidelity (WI-FI), a local area network (LAN), and the like.

Although FIG. 1 illustrates the enterprise environment 104, and the computing system 106 connected to one user device 102 and one local web browser 110, one skilled in the art can envision that the enterprise environment 104, and the computing system 106 can be connected to several user devices located at different locations and several local web browser via the communication network 108.

As an example, the user of the user device 102 may access a web application such as the local web browser 110 by launching a web browser, such as the local web browser 110, typing into the web browser's address bar a Uniform Resource Locator (URL) address for a web page, whose rendering causes execution of the local web browser 110, and selecting an "enter" key on the user's keyboard. The local web browser 110 may send a Hypertext Transfer Protocol (HTTP) request over the internet to the browser agent subsystem 114 for resources that correspond to the URL.

In response to the HTTP request, the local web browser 110 may receive from the browser agent subsystem 114, a set of resources that the browser agent subsystem 114 identified as relevant for the URL (e.g., HTML for a web page, a CSS document, a JavaScript file, and the like). The local web browser 110 may execute the resources, for example, by rendering a parent HTML file and executing other resources referenced therein. The execution of the resources may cause the local web browser 110 to effectively "display" the local web browser 110 on a display device of the user device 102.

The local web browser 110 may be a normal website that includes extra metadata that is installed as part of the browser application. Installable web apps may use standard web technologies for server-side and client-side code.

The local web browser 110 includes one or more web pages. The basic steps involved in displaying a web page on the local web browser 110 include the local web browser 110 requesting a page from the computing system 106. The computing system 106 then determines which web application or web browser is to handle the request, e.g., enterprise or non-enterprise applications and the like. A request is made by the computing system 106 to the determined web application to render the web page. The web application renders the page content and streams it back to the computing system 102, which in turn renders the web page back to the local web browser 110 via the Internet. The rendering of a page involves the execution of code to transform a template specification for the page into browser-readable content (typically HTML, but not restricted to this only). According to an embodiment of the present disclosure, when the local web browser 110 requests a web page, the request is first routed to the browser agent subsystem 114 within the computing system 106. When once the browser agent subsystem 114 receives the web page from the local web browser 110 determines if the web page received contains authentication fields. If yes, then the browser agent subsystem 114 itself determines one or more browsing activities of the user using, hence allowing the users at the user device 102 to access enterprise applications.

The enterprise environment 104 includes a cloud interface, a cloud hardware and operating system (OS), a cloud computing platform, a database, or in data center or on-premises environment. The cloud interface enables the communication between the cloud computing platform and the user device 102. Also, the cloud interface enables the communication between the cloud computing platform and the local web browser 110. The cloud hardware and the OS may include one or more servers on which an operating system is installed and include one or more processing units, one or more storage devices for storing data, and other peripherals required for providing cloud computing functionality. The cloud computing platform is a platform which implements functionalities such as data storage, data analysis, data processing, and data communication on the cloud hardware and the OS via application programming interfaces (APIs) and algorithms and delivers the aforementioned cloud services. The cloud computing platform may include a combination of dedicated hardware and software built on top of the cloud hardware and the OS.

As used herein, "cloud computing environment" or "enterprise environment" refers to a processing environment comprising configurable computing physical and logical assets, for example, networks, servers, storage, applications, services, etc., and data distributed over the cloud platform. The enterprise environment 104 provides on-demand network access to a shared pool of the configurable computing physical and logical assets. The server may include one or more servers on which the OS is installed. The servers may comprise one or more processors, one or more storage devices, such as, memory units, for storing data and machine-readable instructions for example, applications and application programming interfaces (APIs), and other peripherals required for providing cloud computing functionality.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the enterprise environment 104 as is unique to the present disclosure or necessary for an understanding of the present disclosure is depicted and described. The remainder of the construction and operation of the enterprise environment 104 may conform to any of the various current implementations and practices that were known in the art.

In an exemplary embodiment, the system 106 may be configured to monitor at least one of one or more user browsing activities and one or more enterprise contexts on a local web browser hosted on the user device 102 associated with the user and one or more device attributes corresponding to the user device 102. In an exemplary embodiment, the one or more user browsing activities are comprised of, but not limited to, an enterprise universal resource locator (URL) access activity, an enterprise login activity, an enterprise print activity, an enterprise file download activity, and the like. In an exemplary embodiment, the one or more device attributes are comprised of, but not limited to, one or more attributes of an installation of a mobile device management (MDM) application, attributes of an installation of an endpoint detection and response (EDR) application, attributes of an installation of an anti-virus application, and the like. In an exemplary embodiment, the one or more enterprise contexts are comprised of, but not limited to, an identity used in one or more login pages of the web page, the URL address of a software-as-a-service (SaaS) application, the content of the web page, an identity of the user, a user name of the user, a type of file to be downloaded or printed, and the like.

In an exemplary embodiment, the system 106 is to detect a pre-defined enterprise identifier corresponding to an enterprise environment, from at least one of a universal resource locator (URL) address of a web page or one or more user login credentials input on the local web browser 110 hosted on the user device 102, based on the monitored at least one of one or more user browsing activities. The pre-defined enterprise identifier is comprised of, but not limited to, a pre-defined hostname, a pre-defined username, a pre-defined domain name, and the like. In an exemplary embodiment, the enterprise environment is comprised of, but not limited to, one or more enterprise-based applications, one or more enterprise-based data centers, one or more enterprise-based clouds, one or more enterprise-based software-as-a-service (SaaS) applications, an enterprise-based Internet, and the like. For example, there may be two scenarios for triggering a federate browser, which includes, by detecting a universal resource locator (URL) in a user browser, and by detecting a login page of a web site in a user browser. The URL may be protected in the federated browser and from the login ID (username) of the login page, the user browser may start the federated browser to show the login page to protect the login.

In an exemplary embodiment, the system 106 is configured to initiate, in response to the detected pre-defined enterprise identifier, an execution of the secure web browser 112 hosted on at least one of the user device 102 and a virtual private cloud associated with the enterprise environment. The virtual private cloud corresponds to an isolated environment in a cloud associated with the enterprise environment. The secure web browser 112 hosted on the virtual private cloud is accessed from the local web browser 110.

In an exemplary embodiment, the system 106 is configured to route through a secure browsing subsystem (not shown in FIG. 1), in response to initiating the execution of the secure web browser 112, at least one of a login web page URL, a web page URL, the user login credentials, and information associated with a login webpage corresponding to the login web page URL, from the local web browser 110 to the secure web browser 112. For example, the information could be a geo location or time of the day when there is a login. The secure browsing subsystem is further configured to secure an entire browsing session in the enterprise environment 104 by detecting a malware and a data leakage in the user device 102 and the enterprise environment 104.

The enterprise environment refers to the technology infrastructure, systems, and processes used by large organizations to manage their operations, data, and communications. This can include hardware such as servers, storage devices, and network equipment, as well as software applications and platforms for managing and processing data, communication and collaboration tools, and security systems to protect against cyber threats. The enterprise environments typically involve multiple departments and teams working together to achieve common goals, so there is a need for integration and interoperability between different systems and applications. Enterprise environments also require robust data management and governance policies to ensure data is accurate, accessible, and secure.

In an exemplary embodiment, the system 106 is configured to manage, in response to routing at least one web page URL, or one of the login web page URL, the user login credentials, and the information associated with the login webpage, a list of the enterprise URL or a list of federated identity of the user in the secure web browser, for managing a federated browser security in the enterprise environment. In an exemplary embodiment, the federated browser security may be managed for visibility and control of an enterprise security in the enterprise environment 104.

The federated browser security allows for a centralized approach to managing browser security across an organization's entire network. This means that administrators can monitor and control browser access and usage, ensuring that sensitive data is protected and that employees are not accessing unauthorized websites or applications. By implementing the federated browser security solution, administrators can also gain visibility into browser activity, allowing them to identify potential threats and vulnerabilities before they can cause harm. This can include monitoring for malware and other cyber threats, as well as monitoring employee activity to ensure that policies and regulations are being followed. Additionally, the federated browser security solution can provide control over browser features and settings, allowing administrators to customize and enforce policies based on the specific needs of the organization. For example, administrators may choose to disable certain browser extensions or features that pose a security risk or that are not necessary for employees to perform their job functions.

In an exemplary embodiment, the browser agent subsystem further comprises a malicious activity monitoring subsystem (not shown in FIG. 1). In an exemplary embodiment, the malicious activity monitoring subsystem is configured to monitor one or more malicious activities associated with the one or more user browsing activities on the local web browser. The one or more malicious activities may be monitored by inspecting information associated with network traffic corresponding to the enterprise environment. The one or more malicious activities comprise at least one of a phishing activity, an identity theft activity, and a data leakage activity. In an exemplary embodiment, the malicious activity monitoring subsystem may be configured to route the one or more malicious activities to the secure web browser, based on the monitored one or more malicious activities.

Figure 2:
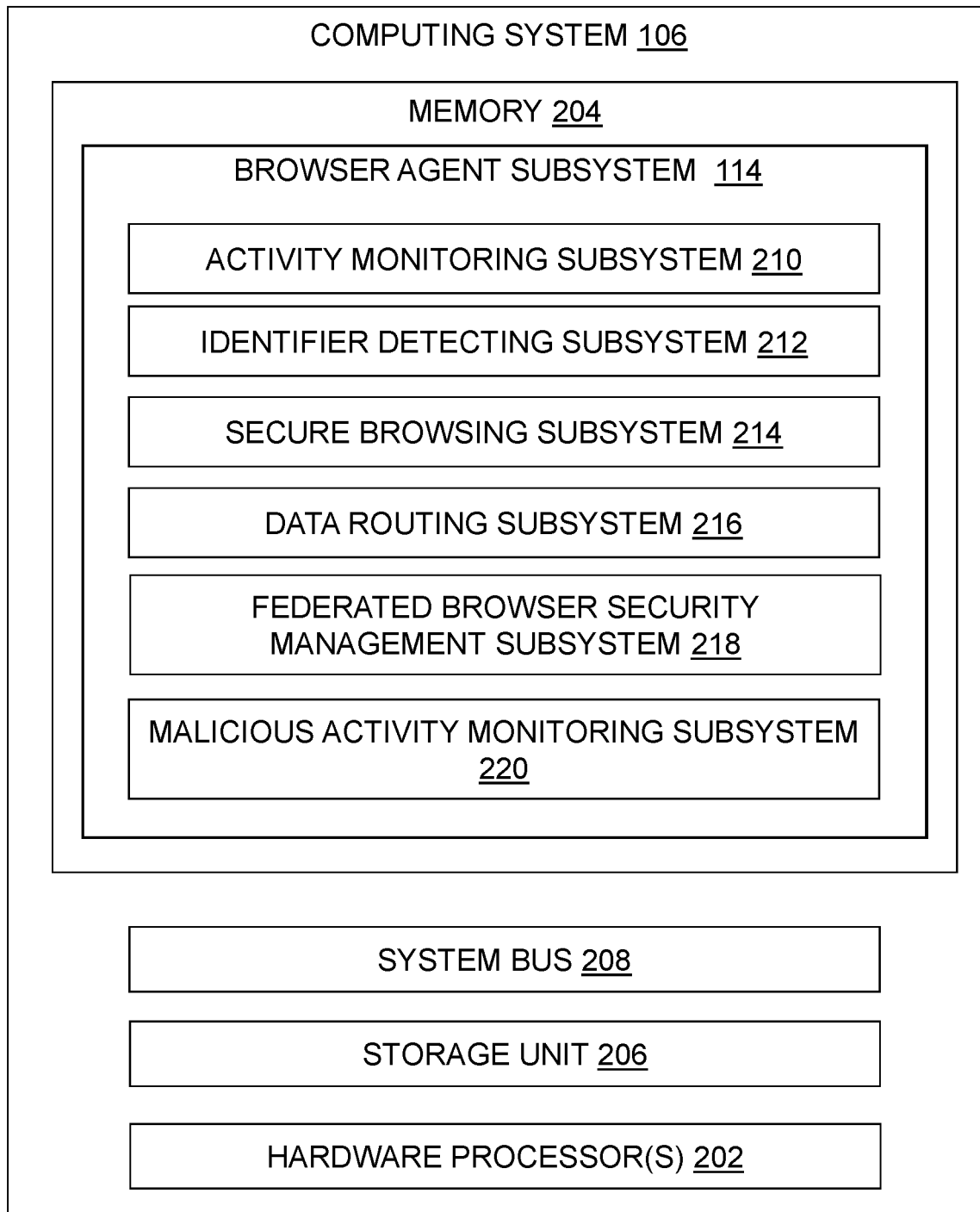
FIG. 2 illustrates an exemplary block diagram representation of a computer-implemented system, such as those shown in FIG. 1, capable of managing a federated browser security in an enterprise environment, in accordance with an embodiment of the present disclosure.

FIG. 2 illustrates an exemplary block diagram representation of a computer-implemented system, such as those shown in FIG. 1, capable of managing a federated browser security in an enterprise environment, in accordance with an embodiment of the present disclosure. The computing system 106 comprises one or more hardware processors 202, a memory 204, and a storage unit 206. The one or more hardware processors 202, the memory 204, and the storage unit 206 are communicatively coupled through a system bus 208 or any similar mechanism. The memory 204 comprises a plurality of subsystems such as the browser agent subsystem 114 in the form of programmable instructions executable by the one or more hardware processors 202.

Further, the browser agent subsystem 114 includes an activity monitoring subsystem 210, an identifier detecting subsystem 212, a secure browsing subsystem 214, a data routing subsystem 216, a federated browser security management subsystem 218, and a malicious activity subsystem 220.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application-specific integrated circuits, single-chip computers, and the like.

The memory 204 may be a non-transitory volatile memory and a non-volatile memory. The memory 204 may be coupled to communicate with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory 204 includes the browser agent subsystem 114 stored in the form of machine-readable instructions on any of the above-mentioned storage media and may be in communication with and executed by the one or more hardware processors 202.

The storage unit 206 may be a cloud storage or a database. The storage unit 206 may store the one or more device attributes corresponding to the user device, one or more user browsing activities, and the one or more enterprise contexts on the local web browser 110. The storage unit 206 may also store the predefined criteria, the predefined score associated with each of the one or more attributes, and the one or more interviews.

In an exemplary embodiment, the activity monitoring subsystem 210 may be configured to monitor at least one of one or more user browsing activities and one or more enterprise contexts on a local web browser hosted on the user device 102 associated with the user and one or more device attributes corresponding to the user device 102. In an exemplary embodiment, the one or more user browsing activities are comprised of, but not limited to, an enterprise universal resource locator (URL) access activity, an enterprise login activity, an enterprise print activity, an enterprise file download activity, and the like. In an exemplary embodiment, the one or more device attributes are comprised of, but not limited to, one or more attributes of an installation of a mobile device management (MDM) application, attributes of an installation of an endpoint detection and response (EDR) application, attributes of an installation of an anti-virus application, and the like. In an exemplary embodiment, the one or more enterprise contexts are comprised of, but not limited to, an identity used in one or more login pages of the web page, the URL address of a software-as-a-service (SaaS) application, the content of the web page, an identity of the user, a user name of the user, a type of file to be downloaded or printed, and the like.

In an exemplary embodiment, the identifier detecting subsystem 212 may be configured to detect a pre-defined enterprise identifier corresponding to an enterprise environment, from at least one of a universal resource locator (URL) address of a web page or one or more user login credentials input on the local web browser 110 hosted on the user device 102, based on the monitored at least one of one or more user browsing activities. The pre-defined enterprise identifier is comprised of, but not limited to, a pre-defined hostname, a pre-defined username, a pre-defined domain name, and the like. In an exemplary embodiment, the enterprise environment is comprised of, but not limited to, one or more enterprise-based applications, one or more enterprise-based data centers, one or more enterprise-based clouds, one or more enterprise-based software-as-a-service (SaaS) applications, an enterprise-based Internet, and the like.

In an exemplary embodiment, the secure browsing subsystem 214 may be configured to initiate, in response to the detected pre-defined enterprise identifier, an execution of the secure web browser 112 hosted on at least one of the user device 102 and a virtual private cloud associated with the enterprise environment. The virtual private cloud corresponds to an isolated environment in a cloud associated with the enterprise environment. The secure web browser 112 hosted on the virtual private cloud is accessed from the local web browser 110.

In an exemplary embodiment, the data routing module 216 may be configured to route through the secure browsing subsystem 214, in response to initiating the execution of the secure web browser 112, at least one of a web page URL, a login web page URL, the user login credentials, and information associated with a login webpage corresponding to the web page URL, the login web page URL, from the local web browser 110 to the secure web browser 112. The secure browsing subsystem 214 is further configured to secure an entire browsing session in the enterprise environment 104 by detecting a malware and a data leakage in the user device 102 and the enterprise environment 104.

In an exemplary embodiment, the federated browser security management subsystem 218 may be configured to manage, in response to routing at least one of the web page URL, the login web page URL, the user login credentials, and the information associated with the login webpage, a list of the enterprise URL or a list of federated identity of the user in the secure web browser, for managing a federated browser security in the enterprise environment. In an exemplary embodiment, the federated browser security may be managed for visibility and control of an enterprise security in the enterprise environment 104. The federated browser security may be based on a federation security model which may include artificial intelligence (AI) or machine learning (ML) models. For example, federation security models are a type of security framework that enables multiple organizations or entities to share resources and information while maintaining security and privacy. In a federation, each organization maintains control over its resources, but allows other organizations to access those resources through a trusted relationship. Federation security models are commonly used in identity and access management (IAM) systems, where multiple organizations need to share authentication and authorization information. In this context, federation security models allow users to authenticate once and access resources across multiple organizations, without the need for separate logins and credentials for each organization. Examples of federation security models include a security assertion markup language (SAML), an OpenID Connect (OIDC), an OAuth, a Kerberos, an active directory federation services (ADFS), a security assertion description language (SADL), and the like. These models use a variety of mechanisms such as token-based authentication, trust relationships, and encryption to ensure the security of shared resources and information.

In an exemplary embodiment, the browser agent subsystem further comprises the malicious activity monitoring subsystem 220. In an exemplary embodiment, the malicious activity monitoring subsystem 220 may be configured to monitor one or more malicious activities associated with the one or more user browsing activities on the local web browser. The one or more malicious activities may be monitored by inspecting information associated with network traffic corresponding to the enterprise environment. The one or more malicious activities comprise at least one of a phishing activity, an identity theft activity, and a data leakage activity. In an exemplary embodiment, the malicious activity monitoring subsystem 220 may be configured to route the one or more malicious activities to the secure web browser, based on the monitored one or more malicious activities.

In an exemplary embodiment, the data routing subsystem 216 may be further configured to detect an access of, from the local web browser, one or more cloud-based browsers associated with a cloud in the enterprise environment, based on the one or more user browsing activities. The one or more cloud-based browsers correspond to the secure web browser. In an exemplary embodiment, the data routing subsystem 216 may be further configured to receive, in response to detecting the access, a continuing image of the one or more cloud-based browsers. In an exemplary embodiment, the data routing subsystem 216 may be further configured to render the received continuing image of the one or more cloud-based browsers, in the local web browser 110. The continuing image comprises a stream of data corresponding to a real-time view of the one or more cloud-based browsers running in the cloud.

Figure 3:
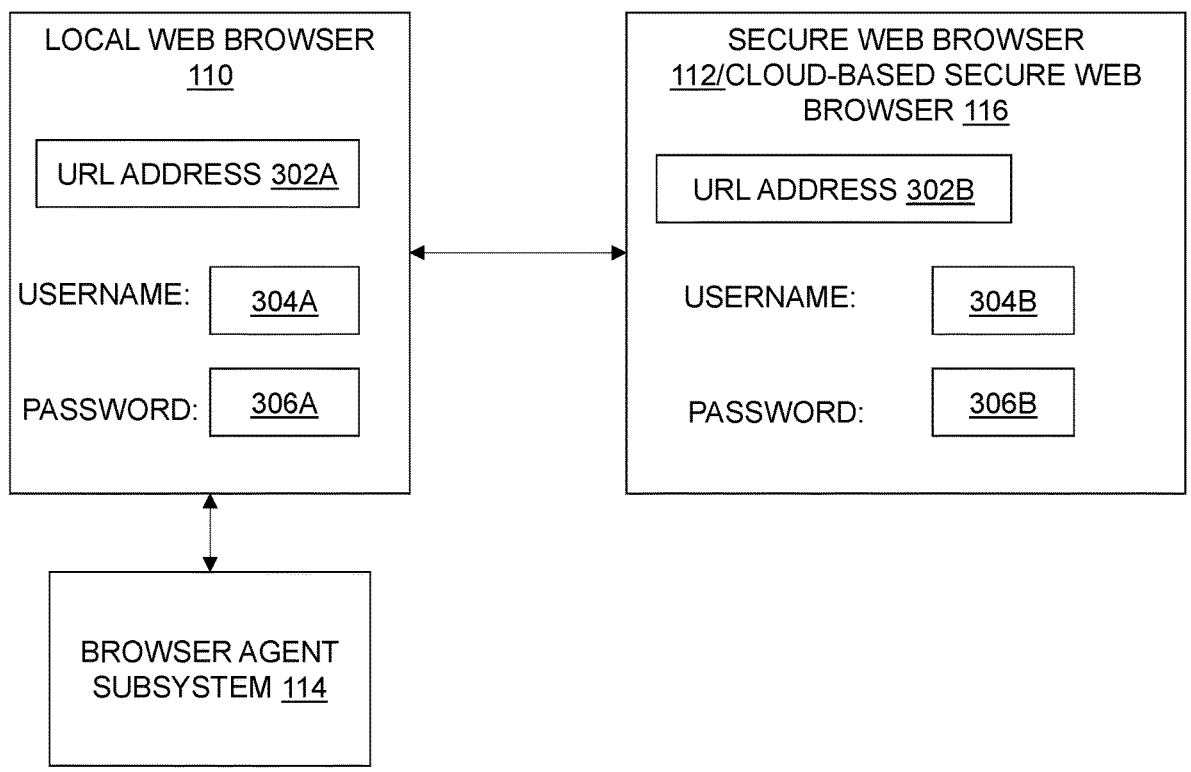
FIG. 3 illustrates an exemplary block diagram representation of a user interface for an access policy in a user-to-application and an application-to-application access, according to an example embodiment of the present disclosure.

FIG. 3 illustrates an exemplary block diagram representation of a user interface for an access policy in a user-to-application and an application-to-application access, according to an example embodiment of the present disclosure.

The user interface may facilitate the user to input a URL address 302A, a username 304A, and a password 306 The user interface may be the local web browser 110. In an example, the local web browser 110 may be associated with the browser agent subsystem 114. The browser agent subsystem 114 may correspond to a browser plugin, or browser agent, and the like.

For example, one or more browser agents may be deployed in the local web browser 110, to monitor users' login activities to one or more enterprise applications. On an endpoint such as the user device 102, the user may be provided with the local web browser 110, and the secure web browser 112 via the enterprise environment. The browser agent subsystem 114 may be installed on the local web browser 110. The browser agent subsystem 114 may monitor user browsing activities. When the browser agent subsystem 114 detects a login page, and the username 304A is entered in the login form. For example, the login page may include a field to enter the password, which may be detected on the HTML page.

The browser agent subsystem 114 may automatically start or open the secure web browser 112, and pass the information of the URL address 302A of the login page, the username 304A, and other information to the secure web browser 112, which is displayed as a URL address 302B, a username 304B, and a password 306B. In an alternate embodiment, one or more tunneling functionalities or application tunneling may be created by the system 106, from the secure web browser 112 to one or more enterprise resources via the secure web browser 112.

With information such as the URL address 302B, the username 304B, and the password 306B, the secure web browser 112 may display the login page with the username 304B, to have the user login into the enterprise application on the secure web browser 112. The secure web browser 112 may then secures the entire session for the enterprise applications, to protect users and the enterprise from malware and data leakage. The system 106 may help the users to use existing browsers for personal browsing, and automatically switch to the secure browser for enterprise applications access where the enterprise could closely monitor malware invasion and data leakage. The secure web browser 112 could be a purpose-built browser that provides visibility and control for enterprise security, either running on the same endpoint, or the secure web browser 112 may run in an isolated environment in the cloud which is accessed from the users' existing browser (as referred as remote browser Isolation in the security industry). The secure web browser 112 may also be referred to as an enterprise access browser (EAB) to achieve federated browser security. The EAB is a type of web browser designed for use in enterprise environments, where security and access control are critical concerns. The EAB is typically a customized version of a standard web browser, with additional security and management features added to meet the needs of enterprise users. One of the key features of an EAB is its ability to integrate with enterprise authentication systems, such as single sign-on (SSO) solutions, smart card authentication, or biometric authentication. This allows users to log in to the browser using their enterprise credentials, and to access enterprise resources and applications without having to repeatedly authenticate themselves. Another important feature of an EAB is its ability to enforce enterprise security policies, such as restricting access to certain websites or blocking downloads of certain file types. The EAB may also incorporate additional security features, such as encryption, malware protection, or sandboxing, to protect users from security threats. In addition to security features, an EAB may also include enterprise-specific management and deployment tools, such as centralized configuration management, automatic updates, or remote monitoring and troubleshooting.

The secure web browser 112 may include security policies or other policies. Further, the secure web browser 112 may include security policies such as, but not limited to, HTTPS-only policy, blocking third-party cookies, pop-up blocking, no script policy, automatic updates, password manager, ad-blocking, a virtual private network (VPN), and the like. For example, the security policies or other policies may define if user A could access application B, and if user A could print, upload, or download files, and the like. In case of a bring your own device (BYOD) and/or bring your own technology (BYOT) associated with the user, the user may need to install the browser plugin such as the browser agent subsystem 114.

Further, the secure web browser 112 may run in an isolated environment in the cloud which is accessed from users' existing browsers. The secure web browser 112 may be hosted in a container in the cloud. When users use the existing browser to connect to the browsers in the cloud, the browsers in the cloud may send a continuing image of the browser rendering to the local browser. The concept may be similar to a virtual desktop. Consider a scenario where users are accessing remote desktops or virtual machines in the cloud, which are running web browsers, and can view a "continuing image" of the browser rendering on their local machines. In this scenario, the remote browser in the cloud is essentially streaming a video feed of its rendering to the local browser on the user's machine. This can be done using various remote access technologies, such as Remote Desktop Protocol (RDP), Virtual Network Computing (VNC), or web-based solutions like HTML5-based remote desktops. The "continuing image" that the user views is essentially a live video stream of the remote browser's display, which is updated in real-time as the user interacts with the browser. This allows users to access and use web applications or websites that may be running on a remote machine, without having to install or maintain the software locally.

In another example, the secure web browser 112 may be blocked from accessing certain restricted websites during secure browsing via the secure web browser 112.

Figure 4:
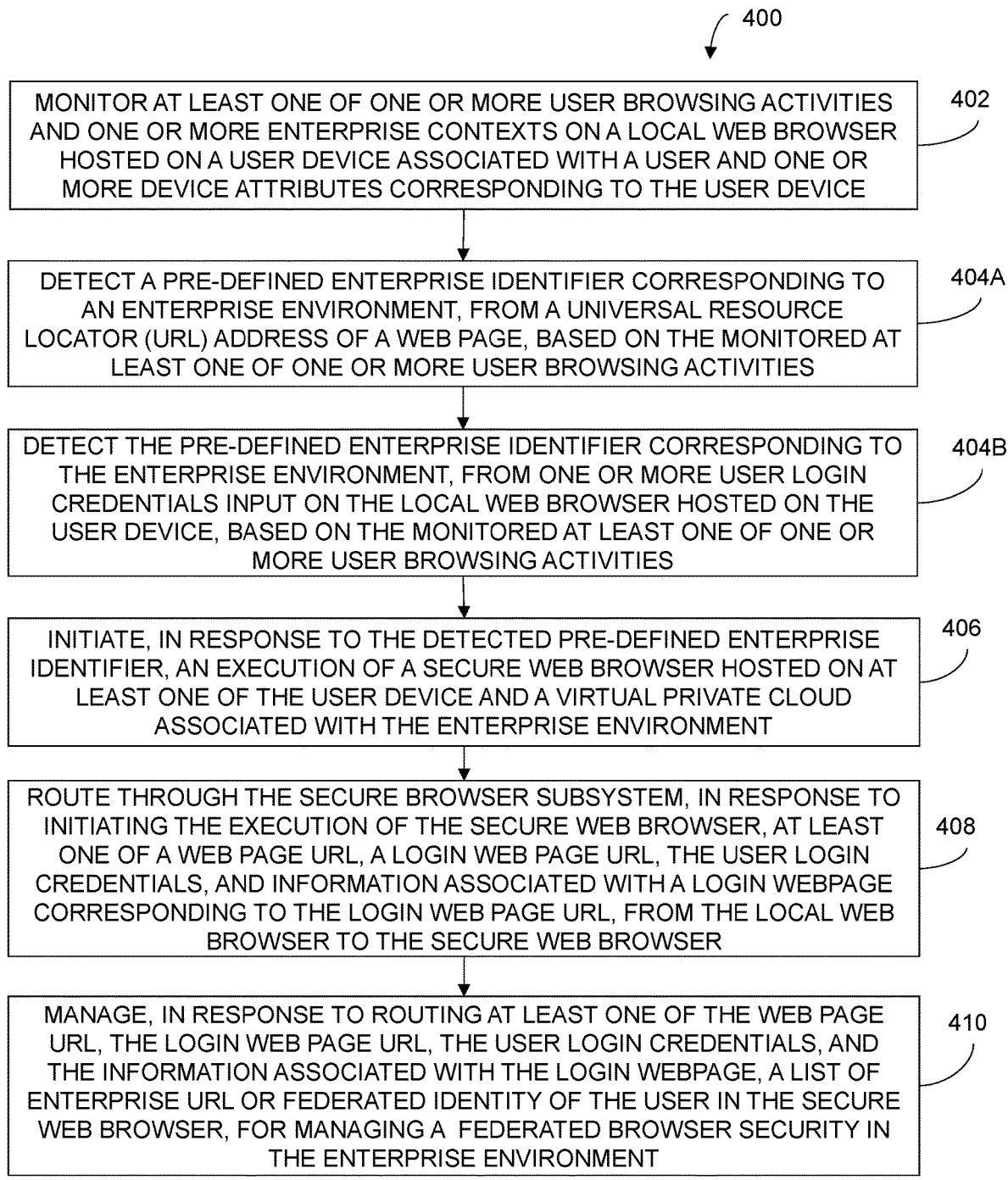
FIG. 4 illustrates a flow chart depicting a method for managing a federated browser security in an enterprise environment, according to an example embodiment of the present disclosure.

FIG. 4 illustrates a flow chart depicting a method 400 for managing a federated browser security in an enterprise environment, according to an example embodiment of the present disclosure.

At block 402, the method 400 includes monitoring, by one or more hardware processors 202, at least one of one or more user browsing activities, and one or more enterprise contexts on the local web browser 110 hosted on the user device 102 associated with the user and one or more device attributes corresponding to the user device.

At block 404A, the method 400 includes detecting, by the one or more hardware processors 202, a pre-defined enterprise identifier corresponding to an enterprise environment, from at least one of a universal resource locator (URL) addresses of a web page or one or more user login credentials input on the local web browser hosted on the user device, based on the monitored at least one of one or more user browsing activities. The pre-defined enterprise identifier is comprised of at least one of a pre-defined hostname, a pre-defined username, and a pre-defined domain name, and the like.

At block 404B, the method 400 includes detecting, by the one or more hardware processors 202, the pre-defined enterprise identifier corresponding to the enterprise environment, from one or more user login credentials input on the local web browser hosted on the user device, based on the monitored at least one of one or more user browsing activities.

At block 406, the method 400 includes initiating, by the one or more hardware processors 202, in response to the detected pre-defined enterprise identifier, an execution of a secure web browser hosted on at least one of the user device 102 and a virtual private cloud associated with the enterprise environment.

At block 408, the method 400 includes routing, by the one or more hardware processors 202, through the secure browsing subsystem, in response to initiating the execution of the secure web browser, at least one of a webpage URL, a login web page URL, the user login credentials, and information associated with a login webpage corresponding to the web page URL, the login web page URL, from the local web browser 110 to the secure web browser 112.

At block 410, the method 400 includes managing, by the one or more hardware processors 202, in response to routing at least one of the webpage URL, the login web page URL, the user login credentials, and the information associated with the login webpage, a list of the enterprise URL, a list of federated identity of the user in the secure web browser, for managing a federated browser security in the enterprise environment. The federated browser security is managed for visibility and control of an enterprise security in the enterprise environment 104.

The method 400 may be implemented in any suitable hardware, software, firmware, or combination thereof. The order in which the method 400 is described is not intended to be construed as a limitation, and any number of the described method blocks may be combined or otherwise performed in any order to implement the method 400 or an alternate method. Additionally, individual blocks may be deleted from the method 400 without departing from the spirit and scope of the present disclosure described herein. Furthermore, the method 400 may be implemented in any suitable hardware, software, firmware, or a combination thereof, that exists in the related art or that is later developed. The method 400 describes, without limitation, the implementation of the system 106. A person of skill in the art will understand that method 400 may be modified appropriately for implementation in various manners without departing from the scope and spirit of the disclosure.

Figure 5:
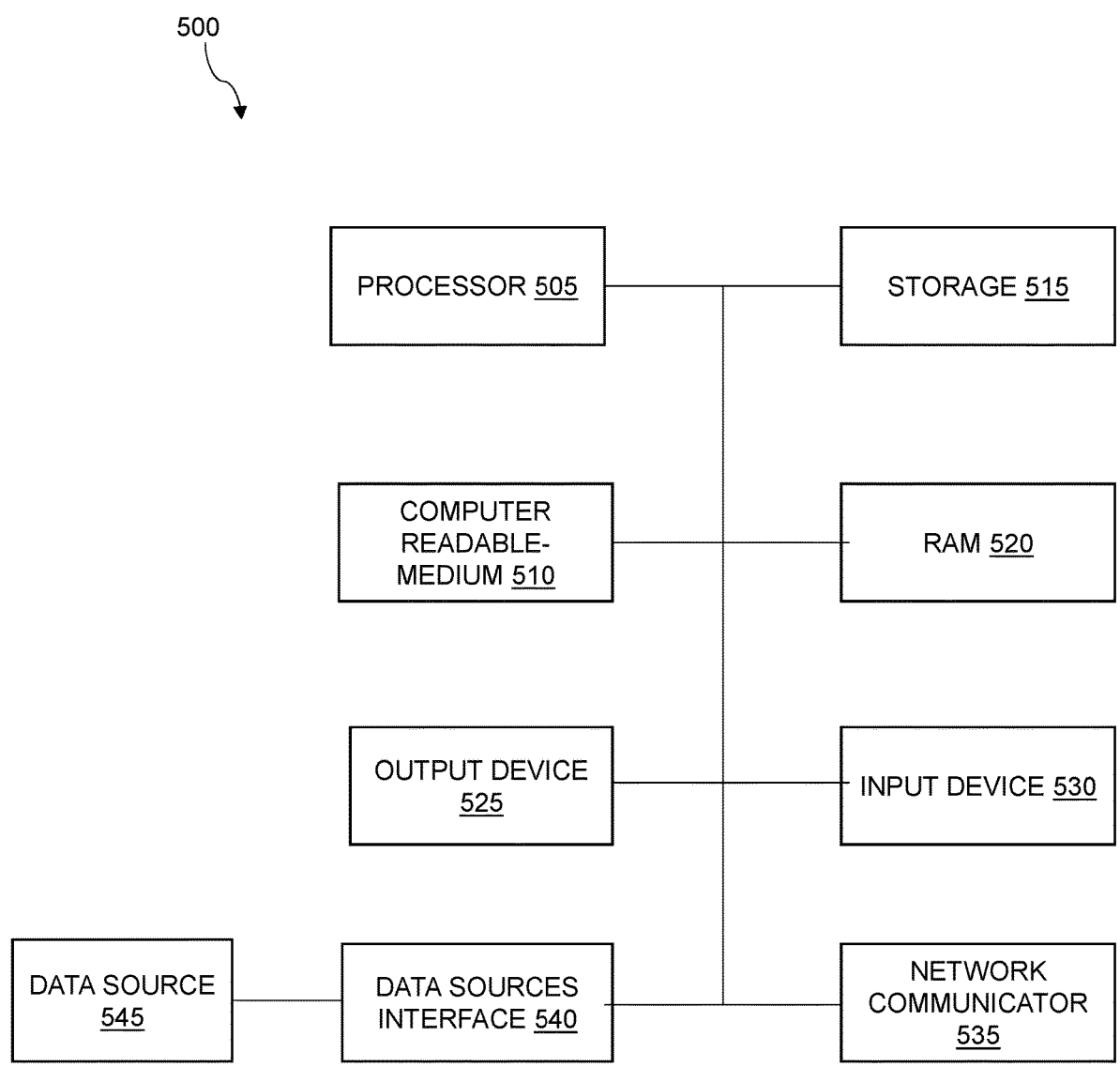
FIG. 5 illustrates an exemplary block diagram representation of a hardware platform for an implementation of the disclosed system, according to an example embodiment of the present disclosure.

FIG. 5 illustrates an exemplary block diagram representation of a hardware platform 500 for implementation of the disclosed system 106, according to an example embodiment of the present disclosure. For the sake of brevity, the construction, and operational features of the system 106 which are explained in detail above are not explained in detail herein. Particularly, computing machines such as but not limited to internal/external server clusters, quantum computers, desktops, laptops, smartphones, tablets, and wearables which may be used to execute the system 106 or may include the structure of the hardware platform 500. As illustrated, the hardware platform 500 may include additional components not shown, and some of the components described may be removed and/or modified. For example, a computer system with multiple GPUs may be located on external-cloud platforms including Amazon Web Services, or internal corporate cloud computing clusters, or organizational computing resources.

The hardware platform 500 may be a computer system such as the system 106 that may be used with the embodiments described herein. The computer system may represent a computational platform that includes components that may be in a server or another computer system. The computer system may execute, by the processor 505 (e.g., single or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 505 that executes software instructions or code stored on a non-transitory computer-readable storage medium 510 to perform methods of the present disclosure. The software code includes, for example, instructions to gather data and analyze the data. For example, the browser agent subsystem 114 includes the activity monitoring subsystem 210, the identifier detecting subsystem 212, the secure browsing subsystem 214, the data routing subsystem 216, the federated browser security management subsystem 218, and the malicious activity subsystem 220.

The instructions on the computer-readable storage medium 510 are read and stored the instructions in storage 515 or random access memory (RAM). The storage 515 may provide a space for keeping static data where at least some instructions could be stored for later execution. The stored instructions may be further compiled to generate other representations of the instructions and dynamically stored in the RAM such as RAM 520. The processor 505 may read instructions from the RAM 520 and perform actions as instructed.

The computer system may further include the output device 525 to provide at least some of the results of the execution as output including, but not limited to, visual information to users, such as external agents. The output device 525 may include a display on computing devices and virtual reality glasses. For example, the display may be a mobile phone screen or a laptop screen. GUIs and/or text may be presented as an output on the display screen. The computer system may further include an input device 530 to provide a user or another device with mechanisms for entering data and/or otherwise interacting with the computer system. The input device 530 may include, for example, a keyboard, a keypad, a mouse, or a touchscreen. Each of these output devices 525 and input device 530 may be joined by one or more additional peripherals. For example, the output device 525 may be used to display the results such as bot responses by the executable chatbot.

A network communicator 535 may be provided to connect the computer system to a network and in turn to other devices connected to the network including other clients, servers, data stores, and interfaces, for example. A network communicator 535 may include, for example, a network adapter such as a LAN adapter or a wireless adapter. The computer system may include a data source(s) interface 540 to access the data source 545. The data source 545 may be an information resource. As an example, a database of exceptions and rules may be provided as the data source 545. Moreover, knowledge repositories and curated data may be other examples of the data source 545.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limited of the scope of the invention, which is outlined in the following claims.

What is claimed is:

1. A computer-implemented system for managing a federated browser security in an enterprise environment, the computer-implemented system comprising:
   one or more hardware processors; and
   a memory coupled to the one or more hardware processors, wherein the memory comprises a browser agent subsystem in form of programmable instructions executable by the one or more hardware processors, wherein the browser agent subsystem comprises:

an activity monitoring subsystem configured to monitor at least one of one or more user browsing activities and one or more enterprise contexts on a local web browser hosted on a user device associated with a user and one or more device attributes corresponding to the user device;

an identifier detecting subsystem configured to detect a pre-defined enterprise identifier corresponding to an enterprise environment, from a universal resource locator (URL) address of a web page, based on the monitored at least one of one or more user browsing activities;

the identifier detecting subsystem configured to detect the pre-defined enterprise identifier corresponding to the enterprise environment, from one or more user login credentials input on the local web browser hosted on the user device, based on the monitored at least one of one or more user browsing activities;

a secure browsing subsystem configured to initiate, in response to the detected pre-defined enterprise identifier, an execution of a secure web browser hosted on at least one of the user device and a virtual private cloud associated with the enterprise environment;

a data routing subsystem configured to route through the secure browsing subsystem, in response to initiating the execution of the secure web browser, at least one of a webpage URL, a login web page URL, the user login credentials, and information associated with a login webpage corresponding to the web page URL, the login web page URL, from the local web browser to the secure web browser; and a federated browser security management subsystem configured to manage, in response to routing at least one of the web page URL, the login web page URL, the user login credentials, and the information associated with the login webpage, a list of the enterprise URL, a list of federated identity of the user in the secure web browser, for managing a federated browser security in the enterprise environment, wherein the federated browser security is managed for visibility and control of an enterprise security in the enterprise environment.

2. The computer-implemented system of claim 1, wherein the browser agent subsystem further comprises a malicious activity monitoring subsystem configured to:

monitor one or more malicious activities associated with the one or more user browsing activities on the local web browser, wherein the one or more malicious activities are monitored by inspecting information associated with network traffic corresponding to the enterprise environment; and route the one or more malicious activities to the secure web browser, based on the monitored one or more malicious activities.

3. The computer-implemented system of claim 2, wherein the one or more malicious activities comprise at least one of a phishing activity, an identity theft activity, and a data leakage activity.

4. The computer-implemented system of claim 1, wherein the data routing subsystem is further configured to:

detect an access of, from the local web browser, one or more cloud-based browsers associated with a cloud in the enterprise environment, based on the one or more user browsing activities, wherein the one or more cloud-based browsers corresponds to the secure web browser;

receive, in response to detecting the access, a continuing image of the one or more cloud-based browsers; and render the received continuing image of the one or more cloud-based browsers, in the local web browser, wherein the continuing image comprises a stream of data corresponding to a real-time view of the one or more cloud-based browsers running in the cloud.

5. The computer-implemented system of claim 1, wherein the secure browsing subsystem is further configured to secure an entire browsing session in the enterprise environment by detecting a malware and a data leakage in the user device and the enterprise environment.

6. The computer-implemented system of claim 1, wherein the one or more user browsing activities are comprised of at least one of an enterprise universal resource locator (URL) access activity, an enterprise login activity, an enterprise print activity, and an enterprise file download activity.

7. The computer-implemented system of claim 1, wherein the one or more device attributes are comprised of at least one of one or more attributes of an installation of a mobile device management (MDM) application, attributes of an installation of an endpoint detection and response (EDR) application, and attributes of an installation of an anti-virus application.

8. The computer-implemented system of claim 1, wherein the one or more enterprise contexts are comprised of at least one of an identity used in one or more login pages of the web page, the URL address of a software-as-a-service (SaaS) application, content of the web page, an identity of the user, a user name of the user, and a type of file to be downloaded or printed.

9. The computer-implemented system of claim 1, wherein the pre-defined enterprise identifier is comprised of at least one of a pre-defined hostname, a pre-defined username, and a pre-defined domain name.

10. The computer-implemented system of claim 1, wherein the enterprise environment is comprised of at least one of one or more enterprise-based applications, one or more enterprise-based data centers, one or more enterprise-based clouds, one or more enterprise-based software-as-a-service (SaaS) applications, and an enterprise-based Internet.

11. The computer-implemented system of claim 1, wherein the virtual private cloud corresponds to an isolated environment in a cloud associated with the enterprise environment.

12. The computer-implemented system of claim 1, wherein the secure web browser hosted on the virtual private cloud is accessed from the local web browser.

13. A computer-implemented method for managing a federated browser security in an enterprise environment, the computer-implemented method comprising:

monitoring, by one or more hardware processors, at least one of one or more user browsing activities, and one or more enterprise contexts on a local web browser hosted on a user device associated with a user and one or more device attributes corresponding to the user device, detecting, by the one or more hardware processors, a pre-defined enterprise identifier corresponding to an enterprise environment, from a universal resource locator (URL) address of a web page, based on the monitored at least one of one or more user browsing activities, wherein the pre-defined enterprise identifier is comprised of at least one of a pre-defined hostname, a pre-defined username, and a pre-defined domain name;

detecting, by the one or more hardware processors, the pre-defined enterprise identifier corresponding to the enterprise environment, from one or more user login credentials input on the local web browser hosted on the user device, based on the monitored at least one of the one or more user browsing activities;

initiating, by the one or more hardware processors, in response to the detected pre-defined enterprise identifier, an execution of a secure web browser hosted on at least one of the user device and a virtual private cloud associated with the enterprise environment;

routing, by the one or more hardware processors, through the secure browsing subsystem, in response to initiating the execution of the secure web browser, at least one of a webpage URL, a login web page URL, the user login credentials, and information associated with a login webpage corresponding to the web page URL, the login web page URL, from the local web browser to the secure web browser; and managing, by the one or more hardware processors, in response to routing at least one of the webpage URL, the login web page URL, the user login credentials, and the information associated with the login webpage, a list of the enterprise URL, a list federated identity of the user in the secure web browser, for managing a federated browser security in the enterprise environment, wherein the federated browser security is managed for visibility and control of an enterprise security in the enterprise environment.

14. The computer-implemented method of claim 13 further comprising:

monitoring, by the one or more hardware processors, one or more malicious activities associated with the one or more user browsing activities on the local web browser, wherein the one or more malicious activities are monitored by inspecting information associated with network traffic corresponding to the enterprise environment, wherein the one or more malicious activities comprise at least one of a phishing activity, an identity theft activity, and a data leakage activity; and routing, by the one or more hardware processors, the one or more malicious activities to the secure web browser, based on the monitored one or more malicious activities.

15. The computer-implemented method of claim 13 further comprising:

detecting, by the one or more hardware processors, an access of, from the local web browser, one or more cloud-based browsers associated with a cloud in the enterprise environment, based on the one or more user browsing activities, wherein the one or more cloud-based browsers corresponds to the secure web browser;

receiving, by the one or more hardware processors, in response to detecting the access, a continuing image of the one or more cloud-based browsers; and rendering, by the one or more hardware processors, the received continuing image of the one or more cloud-based browsers, in the local web browser, wherein the continuing image comprises a stream of data corresponding to a real-time view of the one or more cloud-based browsers running in the cloud.

16. The computer-implemented method of claim 13 further comprising securing, by the one or more hardware processors, an entire browsing session in the enterprise environment by detecting a malware and a data leakage in the user device and the enterprise environment.

17. The computer-implemented method of claim 13, wherein the one or more user browsing activities are comprised of at least one of an enterprise universal resource locator (URL) access activity, an enterprise login activity, an enterprise print activity, and an enterprise file download activity, and wherein the one or more device attributes are comprised of at least one of one or more attributes of an installation of a mobile device management (MDM) application, attributes of an installation of an endpoint detection and response (EDR) application, and attributes of an installation of an anti-virus application.

18. The computer-implemented method of claim 13, wherein the one or more enterprise contexts are comprised of at least one of an identity used in one or more login pages of the web page, the URL address of a software-as-a-service (SaaS) application, content of the web page, an identity of the user, a user name of the user, and a type of file to be downloaded or printed, and wherein the enterprise environment is comprised of at least one of one or more enterprise-based applications, one or more enterprise-based data centers, one or more enterprise-based clouds, one or more enterprise-based software-as-a-service (SaaS) applications, and an enterprise-based Internet.

19. The computer-implemented method of claim 13, wherein the virtual private cloud corresponds to an isolated environment in a cloud associated with the enterprise environment, and wherein the secure web browser hosted on the virtual private cloud is accessed from the local web browser.

20. A non-transitory computer-readable storage medium having programmable instructions stored therein, that when executed by one or more hardware processors, cause the one or more hardware processors to:

monitor at least one of one or more user browsing activities and one or more enterprise contexts on a local web browser hosted on a user device associated with a user and one or more device attributes corresponding to the user device, detect a pre-defined enterprise identifier corresponding to an enterprise environment, from at least one of a universal resource locator (URL) address of a web page and one or more user login credentials input on the local web browser hosted on the user device, based on the monitored at least one of one or more user browsing activities;

detect the pre-defined enterprise identifier corresponding to the enterprise environment, from one or more user login credentials input on the local web browser hosted on the user device, based on the monitored at least one of one or more user browsing activities;

initiate, in response to the detected pre-defined enterprise identifier, an execution of a secure web browser hosted on at least one of the user device and a virtual private cloud associated with the enterprise environment;

route through the secure browsing subsystem, in response to initiating the execution of the secure web browser, at least one of a web page URL, a login web page URL, the user login credentials, and information associated with a login webpage corresponding to the web page URL, login web page URL, from the local web browser to the secure web browser; and manage, in response to routing at least one of the webpage URL, the login web page URL, the user login credentials, and the information associated with the login webpage, a list of the enterprise URL, a list of federated identity of the user in the secure web browser, for managing a federated browser security in the enterprise environment, wherein the federated browser security is managed for visibility and control of an enterprise security in the enterprise environment.

* * * * *